INVENTOR
FREDERICK T. KAELIN.
ATTORNEY

April 10, 1934.　　　F. T. KAELIN　　　1,954,248
ELECTRIC STEAM GENERATOR
Filed Nov. 18, 1931　　2 Sheets-Sheet 2

INVENTOR
FREDERICK T. KAELIN.
ATTORNEY

Patented Apr. 10, 1934

1,954,248

UNITED STATES PATENT OFFICE 1,954,248

ELECTRIC STEAM GENERATOR

Frederick T. Kaelin, Montreal, Quebec, Canada

Application November 18, 1931, Serial No. 575,920

9 Claims. (Cl. 219—40)

This invention relates to improvements in electric steam generators of the type in which water constitutes the resistance medium. The invention relates more particularly to electric steam generators for use on moving vehicles, for example on railway trains, for the production of steam for heating purposes.

An object of the invention is to provide a generator so constructed that it may be housed in a minimum of space and will have a large capacity in proportion to its size. Another object of the invention is to avoid leaking from the generator particularly at the insulators used where the current conductor or conductors pass through the boiler shell. Still another object is to so form and support the electrodes that they will be in large measure relieved of the inertia forces of the water as the water surges with variations in the movement of the vehicle such as rapid acceleration or deceleration, side sway, and centrifugal force incident to movement of the vehicle around a curve.

Various other objects and the advantages of the invention may be ascertained from the following description.

Electric steam generators of the water resistance type as previously built comprise an upright cylindrical boiler in which one or more live electrodes are suspended by means of the electric conductors which pass through large insulators in the top of the boiler. The boilers are also usually formed with depending water legs at the bottom and the arrangements for supplying water to the boiler and bleeding water from the boiler are connected to these water legs at a substantial distance below the boiler. These mechanical features are clearly disclosed in my prior Patents Nos. 1,476,080, 4th December 1923, 1,513,250, 28th October 1924, and 1,525,998 10th February 1925. Boilers of such design are entirely unsuited to use on moving vehicles for a variety of reasons, the principal ones of which are the vertical height required for the installation, the difficulty of avoiding leaking at the insulators due to the mechanical stress imposed on them by surging of the water against the electrodes, and also the difficulty of maintaining satisfactory insulation when the insulators are subjected to mechanical stress by the surging of water. In addition, the former methods of supporting the live electrodes are unsatisfactory for use on a moving vehicle, because of lack of sufficient rigidity to resist the inertia force of the water and maintain the electrodes in proper relation.

The present invention comprises essentially the provision of a live electrode supported entirely independently of the current conductor or conductors and their insulator or insulators, so that neither the conductor nor insulator is subjected to any mechanical load incident to the support or movement of the live electrode; the supporting means of the live electrode and its insulation from the boiler being located entirely within the boiler whereby the necessity of fluid tight joints in the supporting means is eliminated; and the conductor or conductors being preferably so formed as to prevent transmission of electrode movement to the insulator or insulators. The present invention further comprises the location of the various service connections of the boiler, both fluid and electric, at intervals between the bottom and top of the boiler proper, whereby all upward and downward projections from the boiler are eliminated, thereby greatly reducing the vertical space necessary for installation as compared with the vertical space required for installation of boilers of equal capacity, as shown in the aforesaid patents. The invention still further comprises the novel arrangement and relation of electrodes and service connections within the boiler permitting the aforesaid elimination of external upward and downward projections from the boiler, the whole as will be more fully disclosed in the following description and the claims.

In the accompanying drawings which illustrate one embodiment of the invention:—

Figure 1:
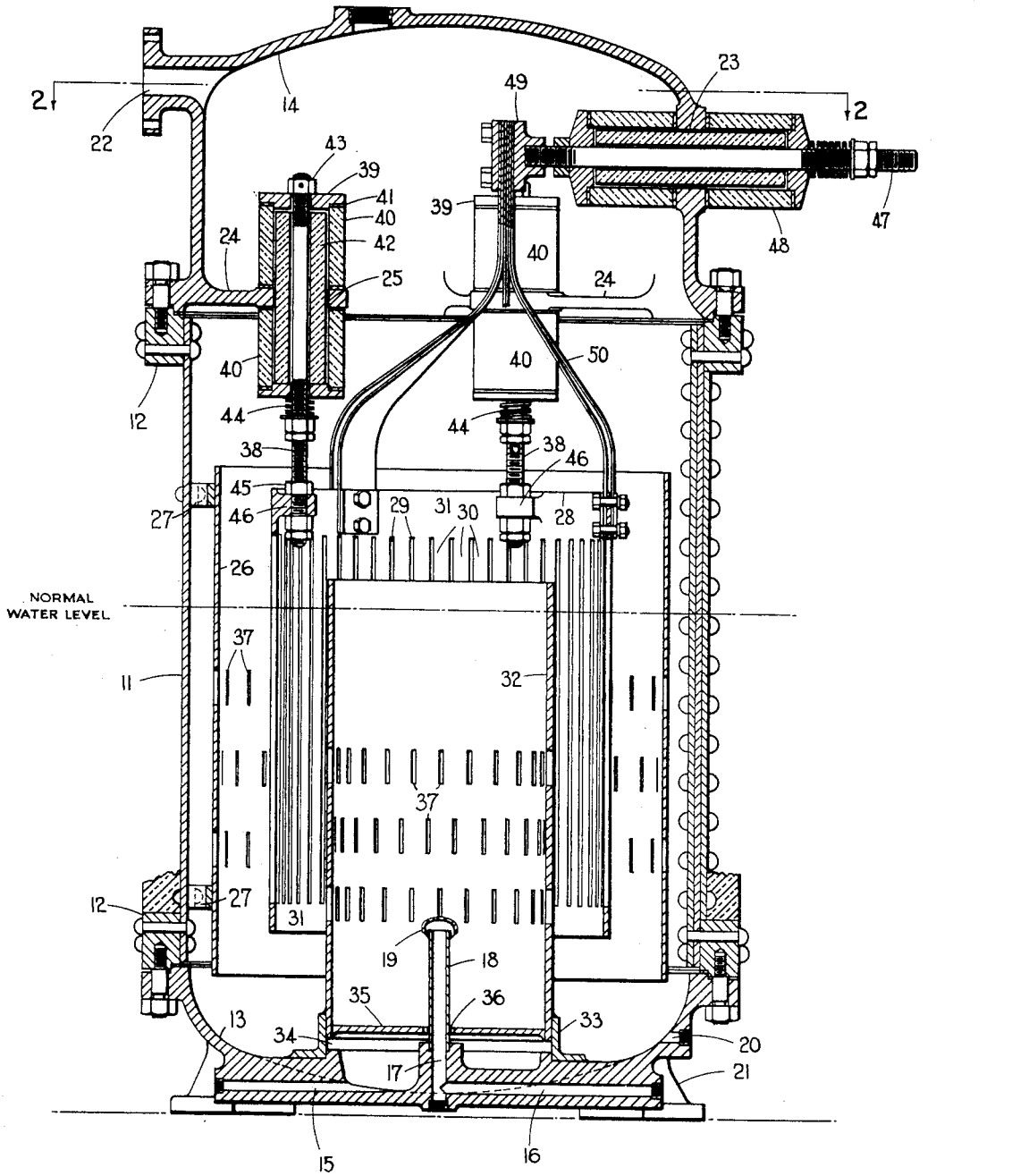
Fig. 1 is a vertical sectional view of a boiler through the axis thereof.
Figure 2:
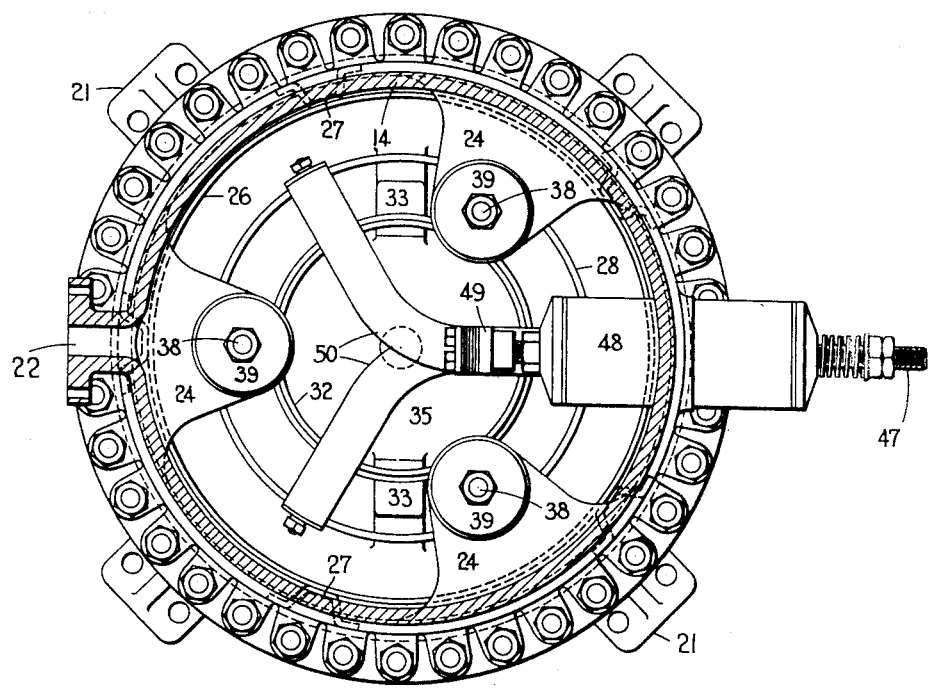
Fig. 2 is a horizontal sectional view of a boiler on the line 2—2 of Figure 1.

Referring more particularly to the drawings, 11 designates a preferably cylindrical shell which may conveniently be constructed of boiler plate and provided with top and bottom flanges 12 adapted for the attachment of bottom and top heads 13 and 14 respectively, which are preferably castings concave on their inner surfaces and formed with the various apertures and passages necessary for the establishment of the fluid and the electric connections of the boiler. The bottom 13 is provided with a laterally directed blow-off passage 15, leading from the lowest or central part of the bottom, and with a laterally directed water inlet passage 16 which terminates in a rising portion 17, preferably centered on the axis of the boiler and to the upper end of which a pipe 18 of suitable height is connected for the purpose of carrying the point of water release in the boiler a suitable distance above the bottom. The upper end of this pipe may be provided with an apertured cap 19 adapted to aid in diffusing the entering water through that already in the boiler. The bottom is also provided preferably slightly above the blow-off and water inlet with a laterally directed bleed off passage 20, this passage being preferably located a material distance below the upper end of the pipe 18. The bottom may be provided with feet 21 to support the boiler. The upper end 14 of the boiler is provided close to the top with a laterally directed steam outlet passage 22 and at a suitable point with a laterally directed aperture 23 for the insertion of an electric conductor and its insulator. The boiler is provided with one or more inwardly projecting flanges or brackets 24 for the support of the live electrode, these flanges or brackets being most conveniently an integral part of the casting 14 and being provided with apertures 25 for the passage of electrode supports.

A preferably cylindrical ground electrode 26 is provided within the boiler and may be co-axial therewith, said electrode being mechanically and electrically connected to the boiler by supporting brackets 27. This ground electrode is disposed in spaced relation to the boiler shell and is preferably quite smooth on its inner surface and free from projections of any sort which would cause undesirable local concentrations of current density. A live electrode 28 is provided within the ground electrode 26 in surface parallel relation thereto. In the single phase boiler illustrated, this live electrode is preferably cylindrical but, in the case of more than one phase being connected in the boiler, a corresponding number of live electrodes will be provided equidistant from the ground electrode and in surface parallel relation thereto, as shown in my Patent No. 1,476,080. The live electrode 28 is according to this invention provided with a plurality of comparatively closely spaced slots 29 extending in the axial direction of the electrode, that is, in the direction of current flow therethrough. These slots divide the electrode into a plurality of comparatively narrow spaced bars 30 connected at their upper and lower ends by rings 31. The relation of slot area to bar area is such that water in the boiler may flow freely from the inside to the outside of the electrode, or vice versa, as the water surges in consequence of variation in the movement of a vehicle on which the boiler is carried. Within the live electrode 28, a second ground electrode 32 is provided preferably in the form of a cylindrical tube open at its upper end arranged co-axial with the boiler and therefore in surface parallel relation with the live electrode. The second ground electrode is supported on the boiler bottom, either directly or through the intermediary of any suitable means, such as the brackets 33. The exact manner of support is immaterial as long as provision is made for water flow passages 34 under the electrode to permit water outside the electrode reaching the blow-off passage 15. The bottom of the ground electrode 32 may be substantially closed by a plate 35 provided with a suitable drainage opening, preferably that designated 36, and located adjacent the pipe 18. The outer and inner ground electrodes 26 and 32 may be provided with apertures 37 of any suitable shape, size, number and arrangement to permit of movement of water in the boiler. As will be observed in Fig. 1 of the drawings, the outer ground electrode extends above and below the live electrode sufficiently to prevent any discharge directly between the live electrode and the boiler shell, while the inner ground electrode terminates at such distance below the top of the live electrode as will prevent discharge between the supports of the live electrode and the upper end of the ground electrode. The lower end of the inner ground electrode is of course electrically as well as mechanically connected with the boiler bottom.

The live electrode 28 is suspended from its upper end by rods 38 which pass centrally through the apertures 25 of the brackets 24 and are suitably supported on and insulated from the brackets. The supporting and insulating means preferably comprises a pair of large washers 39 located one above and one below the bracket 24. Sleeves 40 of insulating material, such as procelain, are clamped between the washers 40 and the upper and lower surfaces of the bracket 24, cushioning gaskets 41 being preferably interposed between the metal and porcelain. Inside the sleeves 40, a further sleeve 42 of porcelain or other insulating material extends continuously from washer to washer around the rod 38 and insulates the rod from the adjacent metal of the bracket 24. Nuts 43 are provided on the rod above and below the insulating structure to clamp the parts thereof together and to the bracket; a spring 44 being interposed between the lower nut and lower washer to afford a certain limited resiliency for the purpose of relieving the porcelain insulators of sudden shocks consequent upon surging of water in the boiler which might fracture the porcelain. The rods 38 are connected to the live electrode in any suitable way, for example, by means of nuts 45 on the rod above and below lugs 46 formed on the inner surface of the electrode, and thus affording such range of adjustment as is necessary to locate the live electrode in exactly surface parallel relation with the ground electrodes. The live electrode is supported at a plurality of points around its circumference by means such as just described, so as to afford as nearly as possible a rigid positioning of the live electrode in proper relation to the ground electrodes. In the event of more than one phase being connected in the boiler, the cylindrical electrode is in effect cut longitudinally into spaced portions corresponding in number to the number of phases connected, and each of such curved electrode plates may be supported as already described at a plurality of points in the arc of its curvature so as to obtain the desired stability.

An electric conductor 47 extends through the aperture 23 in the boiler and is electrically insulated from the boiler by an insulator 48, the details of construction of which may be similar to the insulator already described. The inner end of this conductor 47 is provided with a flexible connection to the live electrode. Conveniently, this flexible connection may be established by providing a clamp 49 on the inner end of the conductor 47 holding the ends of a plurality of flexible members 50, the opposite ends of which are connected in any suitable way to the upper edge of the live electrode. Preferably, these flexible members take the form of wide thin strips of metal and preferably they are connected to the live electrode at a plurality of points around the circumference thereof, as shown, so as to effect a uniform distribution of current to the electrode.

When the boiler is in service, it is normally filled with water nearly to the top of the inner ground electrode, for example, to the level indicated in Figure 1. One side of a transformer or other source of electric energy is connected to the conductor 47 and the other side to any suitable point on the boiler, for example, to one of the feet 21. When the circuit is closed, current flows through the water between the live electrode and the inner and outer ground electrodes, and the water is heated at least to boiling temperature by reason of its own resistance. The steam generated is drawn off through the outlet 22 and sufficient water is admitted through the passage 16 to keep the level approximately constant. Water is bled from the boiler as necessary through the outlet 20 in order to remove accumulations of non-volatile impurities and maintain the conductivity within suitable limits, as is well understood in the operation of these boilers.

The surging of water in the boiler with variations in vehicular movement imposes considerable mechanical loads upon the supporting means of the live electrode, which mechanical loads are quite severe considering the fragile nature of the ceramic insulating material best adapted for the purpose. If the supporting insulators of the live electrode pass through the boiler wall, it would be practically impossible to maintain steam tight joints at the insulators but, by locating the electrode supports and insulators entirely within the boiler, the necessity for fluid tight joints is avoided. Furthermore, by providing supports for the live electrode which are entirely independent of the current conductor, it is possible to lead the conductor in laterally, and thus avoid an upward projection of the conductor beyond the boiler and also enable the use of a flexible conductor which will not transmit movements of the live electrode to the conductor insulator. In this way, the conductor insulator is relieved of all mechanical load beyond that necessary to keep it steam tight, and is also relieved of all shocks and vibration arising from the surging of water against the live electrode. Protection of the conductor insulator from unnecessary mechanical loads greatly reduces the possibility of fracture of the insulator and thereby correspondingly reduces the danger of electric leakage through the fractures. The special construction of the live electrode permitting free flow of water through it reduces the amount of inertia forces of the water imposed on the electrode, and thereby brings the load in the electrode supports down to a point where it is possible to support the electrode substantially rigidly and at the same time maintain insulation between it and the boiler. The provision of an inner ground electrode extending substantially to the bottom of the boiler and the location of the water supply conduit inside this electrode enables the water discharge point to be located so far up in the boiler that it is possible to locate the bleed off above the bottom of the boiler and thus avoid downward projections from the boiler, such as would make its vertical height too great for use such as train heating. The downward extension of the inner ground electrode, besides functioning in the matter of support and of controlling water flow, protects the water inlet against destruction by electric discharge between itself and the live electrode; the water inlet being necessarily raised to approximately the level of the bottom of the live electrode in order to keep the inlet a suitable distance above the bleed off.

For further details of the construction and operation of the inner ground electrode, reference may be had to my copending application Serial No. 575,919 filed of even date herewith.

Having thus described my invention, what I claim is:—

1. In an electric steam generator for use on a moving vehicle such as a railway vehicle; a boiler; an electrode within the boiler; a current conductor passing through the boiler wall and connected to said electrode, said conductor within the boiler being in part flexible and incapable of rigidly supporting the electrode; means electrically insulating said conductor from the boiler; and adjustable means suspending the electrode substantially rigidly from its upper end within the boiler and electrically insulating the electrode from the boiler.

2. In an electric steam generator; a boiler; internally disposed apertured brackets in said boiler; an electrode within the boiler and spaced from said brackets; supporting members connected to the upper end of said electrode and passing through the bracket apertures; insulators between said members and said brackets; means clamping said insulators to said members to substantially rigidly support the electrode in the boiler; and a current carrying conductor leading into the boiler and electrically insulated therefrom and connected to the electrode.

3. In an electric steam generator; a boiler; an electrode within the boiler; means supporting said electrode and electrically insulating same from the boiler, said means including yielding elements designed to protect the insulation against fracture, which yielding elements permit limited movement of the electrode within the boiler; a conductor passing through the boiler wall; means insulating said conductor from the boiler; said conductor including a flexible portion between the conductor insulator and electrode adapted to prevent transmission of electrode movement to the conductor insulator and thereby to protect the conductor insulator from mechanical loads incident to electrode movement.

4. In an electric steam generator for use on a moving vehicle; a boiler; an electrode therein; means supporting said electrode and electrically insulating same from the boiler; said electrode being formed with a series of apertures therein adapted to afford ready passage for water from side to side of the electrode as the water surges in consequence of variations in movement of the vehicle, thereby to relieve the electrode supports and insulation of a substantial part of the inertia forces of the water.

5. In an electric steam generator for use on a moving vehicle; a boiler; an electrode therein; means supporting said electrode and electrically insulating same from the boiler; said electrode comprising a series of narrow bars connected at their ends and extending in the direction of current flow through the electrode, said bars being spaced apart sufficiently to afford ready passage for water from side to side of the electrode as the water surges in consequence of variations in movement of the vehicle, thereby to relieve the electrode supports and insulation of a substantial part of the inertia forces of the water.

6. In an electric steam generator for use on a moving vehicle; a boiler; an electrode therein; means yieldingly supporting said electrode and insulating same from the boiler; an electric conductor connected to the electrode; means insulating said conductor from the boiler; said electrode being formed with a series of apertures adapted to afford ready passage for water from side to side of the electrode as the water surges in consequence of variations in movement of the vehicle, thereby to relieve the electrode of a substantial part of the inertia forces of the water and to co-operate with the yielding support of the electrode to relieve the electrode insulating means and conductor of sudden shocks; said conductor including a flexible portion between the electrode and the conductor insulator adapted to prevent the transmission of electrode movement to the conductor insulator thereby to protect the conductor insulator against mechanical load.

7. In an electric steam generator; a boiler including a pair of heads; a pair of concentrically arranged electrodes within the boiler, one of said electrodes being supported by one of the boiler heads and the other of said electrodes being supported by the other boiler head and adjustable means connecting one of said electrodes to its supporting head whereby the electrodes may be adjusted to surface parallel relation.

8. In an electric steam generator for use on a moving vehicle such as a railway vehicle; a boiler; a cylindrically curved electrode plate suspended within the boiler; and at least three adjustable supporting and insulating means disposed entirely within the boiler connected to the upper end of said plate at different points along the arc of plate curvature thereby to support the electrode against lateral movement.

9. In an electric steam generator for use on a moving vehicle such as a railway vehicle; a boiler; a cylindrically curved electrode within the boiler; adjustable means disposed entirely within the boiler suspending said electrode by its upper end at not less than three points along the arc of its curvature and insulating it from the boiler; an electric conductor separate from said supporting means, connected to the electrode and insulated from the boiler, said conductor being relieved of any electrode supporting function by reason of the disposition of the electrode supports, whereby the conductor insulator is protected against mechanical stress resultant from force applied to the electrode and tending to move same.

FREDERICK T. KAELIN.